May 2, 1961 C. E. MAIER 2,981,976
MOLDING APPARATUS
Filed Sept. 27, 1956 3 Sheets-Sheet 1

INVENTOR
CURTIS E. MAIER

BY *Mason, Porter, Diller & Stewart,*
ATTORNEYS

May 2, 1961

C. E. MAIER 2,981,976

MOLDING APPARATUS

Filed Sept. 27, 1956

INVENTOR
CURTIS E. MAIER

BY Mason, Porter, Diller & Stewart

ATTORNEYS

May 2, 1961 C. E. MAIER 2,981,976
MOLDING APPARATUS
Filed Sept. 27, 1956 3 Sheets-Sheet 3

INVENTOR
CURTIS E. MAIER

BY Mason, Porter, Diller & Stewart

ATTORNEYS

United States Patent Office 2,981,976
Patented May 2, 1961

2,981,976

MOLDING APPARATUS

Curtis E. Maier, Riverside, Ill., assignor to Continental Can Company, Inc., New York, N.Y., a corporation of New York Filed Sept. 27, 1956, Ser. No. 612,470

15 Claims. (Cl. 18—42)

This invention relates to a molding process and apparatus, and is concerned with the production of articles having shapes produced by completely filling closed mold spaces under confined pressure of the moldable material.

An object of the invention is a molding process and apparatus in which moldable material, in quantities predetermined as coming within technically feasible limits of volume tolerance, can be molded to accurate shapes at critical portions of the intended article.

Another object is a molding process in which moldable material, in quantities predetermined as coming within technically feasible limits of volume tolerance, can be molded to accurate shapes by a primary molding step in which the mold is closed and a partial shaping accomplished, and a secondary step in which the final accurate shaping is effected after the mold has been closed.

A further object is a molding apparatus consisting of three relatively movable members, two of which constitute a closed mold having surfaces at which accuracy of conformance and filling is required and having a flexible wall portion, and the third of which is effective upon the flexible wall portion to produce a reduction of internal volume of the closed mold, whereby to complete the molding of the article.

Illustrative examples of practice are shown on the accompanying drawings, in which.

Articles have been made from moldable material by apparatus and processes in which a mold or die member has a cavity shaped to correspond to the exterior of the article and adapted to receive a quantity of the moldable material, together with a plunger member which enters the cavity and displaces the material until it occupies the mold space between the plunger and cavity wall. It has been a practice to provide cooperating ribs on the die and plunger members, which approach one another during the relative movement of the members and provide a dam or barrier for restricting the flow of the moldable material out of the cavity and thus compelling the material to completely fill the aforesaid space and produce accurate conformation to the surfaces of the members. For this, an excess of material must be provided over that needed for the volume of the article, and this excess escapes between the ribs as a so-called "flash" which represents waste and must later be removed.

If the original quantity is very carefully measured by weight or volume to reduce such wastage, this measuring is time-consuming and expensive; and even if performed, any local irregularity in the placing of the mass in the mold cavity, or local irregularity in its flow, may cause the formation of so much flash at one part of the perimeter of the mold closing walls that the amount remaining within the cavity is insufficient to fill the mold space and give an accurate article at another part of the perimeter. When less than the necessary volume of material is originally introduced, a defective article results.

It has been proposed to permit escape of excess material through small vent holes, but in such cases the hardening of the material, incidental to placing it in condition for removal of the article from the mold, renders necessary the clearing of such vents before shaping a new article. Proposals to use spring-pressed pistons and the like, which yield when the mold has been completely filled and thus accommodate an excess of original material, have the difficulty that the surfaces of the piston and its cylinder must be free to permit the sliding yield but therewith provide a crevice which offers a path for the material to escape under the molding pressure, so that the structure soon becomes blocked against movement.

Figure 1:
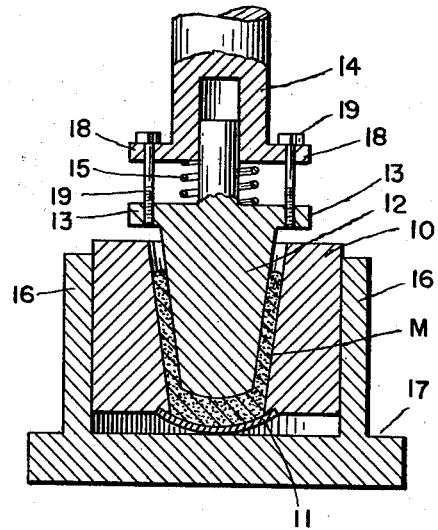
Fig. 1 shows, in conventionalized form, a molding apparatus essentially in upright section, in which the process can be performed, during an early stage of operation.
Figure 2:
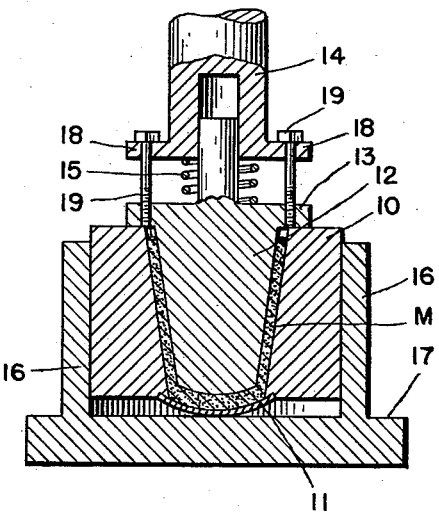
Fig. 2 shows the same apparatus, in the position of parts after closing of the mold parts.
Figure 3:
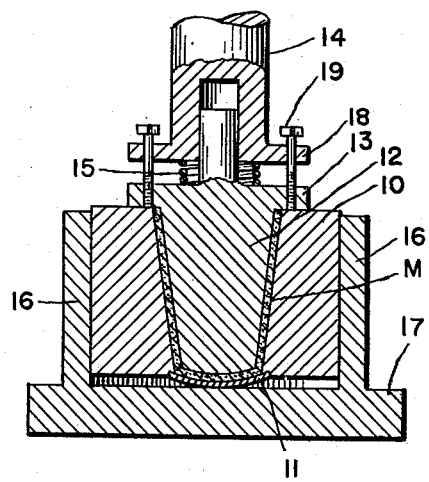
Fig. 3 shows the same apparatus, at the close of the molding operation.

In an illustrative practice according to this invention, as shown in Figs. 1 to 3, a hollow mold body 10 is open at both ends and has a cavity or passage whose walls define the external periphery of the article to be made. A flexible diaphragm 11, e.g. a dome of spring steel, is secured thereto by brazing or welding for example to close and seal one end of the mold cavity, and provides a part of the wall surface thereof. A shaping plunger has a body 12 for determining the internal shape of the article, and its peripheral and end surfaces define, in cooperation with the mold body, a mold space within which the article is to be formed. The flange 13 of the plunger is adapted to come into tight sealing engagement with the mold body, and in the illustrated form gives shape to the top of the article lip. A ram 14 is provided as means for exerting pressure upon the plunger; and a spring 15 is intercalated between them, this spring preferably having the strength necessary to compel the plunger to move with the ram until the plunger flange 13 engages and seals the upper mold opening, that is, during the initial forming of the moldable material. The ram 14 may be forced downward and returned upward by means known to those skilled in molding, e.g. by mechanically driven levers or cranks, by fluid pressure devices, etc. The moldable material can be introduced as a fluid, powder, or pill having a mass or volume within the tolerance limits, in any of the described forms: and heating and cooling may be employed as well known in the art for fluidifying, solidifying or curing the material as indicated by its specific composition. In the form shown in Figs. 1–3, the mold body 10 can move downward along the guides 16 which are supported by a bed plate 17. The domed diaphragm 11 extends from the mold body 10, in the illustrative form, and rests upon the bed plate 17 and therewith supports the mold body against movement during the said initial forming of the material.

In Figs. 1–3, the ears 18 project from the ram 14 and are apertured to receive the bolts 19 which provide adjustable links by which the plunger is retracted during upward movement of the ram, and which permit regulating the spring 15 for determining the initial compression therein: the ears 18 slide along the bolts 19 at the close of the ram movement; and a relative movement occurs during the withdrawal of the ram, followed by positive conjoint withdrawal of the ram and plunger.

In operation, a quantity of the selected moldable material, such as a 100 percent solids plastisol, is measured out and placed in the mold cavity when the plunger is withdrawn. The selected quantity is that which will provide the volume for completely filling the mold space when the plunger flange has just engaged the mold body and before the mold body has made any movement downward, minus a quantity represented by the change of volume produced by less than the maximum flattening of the domed diaphragm 11 during the downward movement of the ram 14. That is, the apparatus and process are effective with a tolerance in the quantity equal to the change of volume due to the flattening of this dome: for example if the volume of the space at first flange contact is 30 cubic centimeters, and the dome can be flattened from a volume of 5 cubic centimeters to a volume of 3 cubic centimeters, the tolerance can be as large as 2 cubic centimeters, and the selected quantity can be between 28 and 30 cubic centimeters, a tolerance which permits rapid measurement and delivery of the moldable material into the mold cavity.

When a quantity M within this tolerance range has been measured and placed in the mold cavity the ram 14 is started downward, for example by turning a crank having a fixed throw and connected for moving the plunger: such arrangements are well known in molding presses and need not be shown or described in detail, as the function is to move the ram 14 downward a definite distance, and later withdraw it again.

As the ram 14 moves downward, the plunger body 12 enters and displaces the fluent material M, so that during the initial stage of forming and until the flange 13 engages the mold body 10 the moldable mass M is given a partial shaping but usually without filling the mold space. When the plunger flange 13 engages the mold body 10, the mold is closed and sealed. Further downward movement of the ram causes the plunger and mold body to move together, therewith causing the flexible domed diaphragm 11 to be distorted by flattening in the illustrated form and thus reducing the internal mold space but without the existence of any crevice into which the mold material can be forced, and this material is caused further to flow and to complete the filling of the thereby reduced volume of the sealed mold space. At some point of this conjoint movement, the mold space is completely filled. At this stage, the flange 13 is pressing strongly in sealing relation upon the mold body 10 and there is no component of force tending to force these apart: the plunger, mold and shaped material form a solid body which blocks further downward movement thereof. The ram spring 15 now yields, until the ram completes its stroke, and can then return. The article can be rigidified, if necessary, in a manner appropriate to the moldable material such as curing of vulcanizable rubber, heat treatment of plastisol or thermosetting resin compositions, cooling of thermoplastic material, etc.; and the parts can be separated, the article removed, and the operation repeated.

Figure 5:
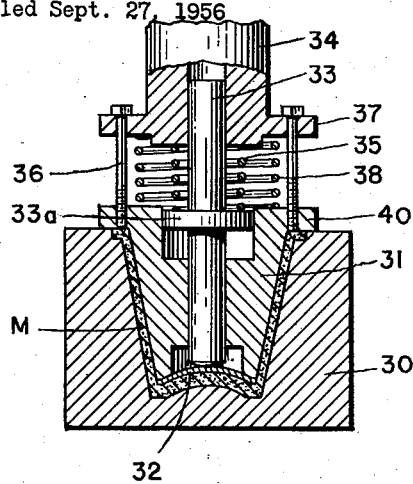
Fig. 5 shows a further modified form of apparatus.
Figure 6:
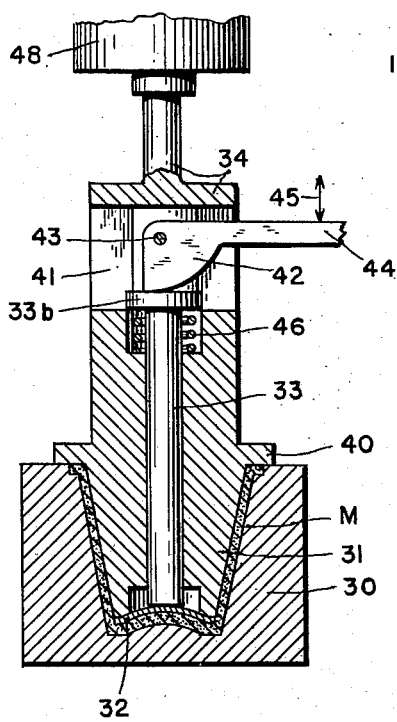
Fig. 6 shows a modification of the apparatus of Fig. 5, with a directly connected fluid pressure actuator.
Figure 9:
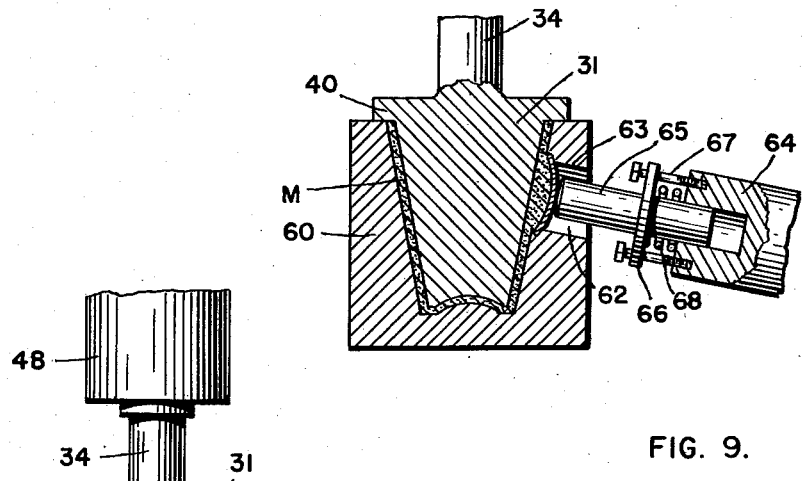
Fig. 9 shows a modified apparatus in which a laterally positioned flexible wall portion is employed.
Figure 8:
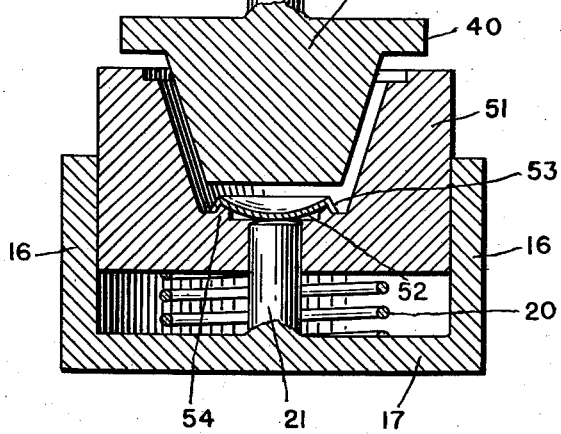
Fig. 8 shows a further modification of the apparatus, with a fluid pressure actuator and a moveable female mold member.

In the apparatus illustrated by Figs. 1 to 4, and 8, the plunger and mold body move relative to a fixed bed 17 and the flexible wall portion is on the mold body. In Figs. 5 and 6, the flexible wall portions are on the shaping plunger, and the mold body is illustratively stationary. In Fig. 9, the mold body is illustratively stationary, and the flexible wall portion is at a side, and not co-axial with the shaping plunger axis of movement. In Figs. 1–5, the shaping plunger is moved by a ram which can have an invariable length of stroke, and yielding devices provide for stoppage of the plunger while the plunger ram completes its stroke. In Figs. 6 and 8, the shaping plunger is moved by a ram actuated by fluid pressure means which is brought to a standstill by the reaction upon mold closure or filling. In Figs. 6 and 8, two separate sources of power are employed, one for the shaping plunger and the other for changing the position of the flexible wall portion and thereby reducing the volume of the closed mold space. These are illustrative of arrangements by which any relative movement and arrangement can be employed which brings the parts into positions in which the mold is closed, and then a flexible diaphragm is moved for reducing the internal mold space.

Figure 4:
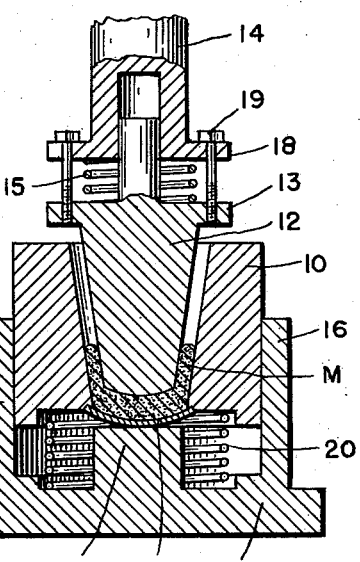
Fig. 4 shows a modified apparatus.

In the apparatus shown in Fig. 4, the major parts are as in Fig. 1. The length of the guide walls 16 is increased, so that a greater space is present between the bottom of the mold body 10 and the top of the base plate 17. A spring 20 is provided in this space, to urge the mold body 12 upwardly during the return of the ram 14 and to yield downwardly during the downward pressure stroke of the ram. An upstanding boss 21 on the base plate 17 is encountered by the flexible diaphragm wall 11 during the downward movement of the mold body 12, and serves to flatten the same and thereby reduce the volume of the closed mold space.

In Fig. 5, the flexible wall portion is provided by a diaphragm 32 on the plunger 31, and the female mold body 30 has its cavity shaped to determine the outer peripheral and bottom contour of the article. A rod 33 is guided for movement in and relative to the plunger 31 and the ram 34, and has a collar 33a for engaging a spring 35 which reacts against the lower end of the ram 34. The flange 40 of the plunger 31 acts to seal the mold space, as before; and the plunger 31 and ram 34 are connected by the adjustable bolts 36, threaded into the flange 40 and slidable in the flange 37 of the ram 34. A second spring 38 engages a lower surface of the ram 34, and acts against the plunger 31 to assure the seating and maintenance of the flange 40 in sealing position. In operation, with the ram 34 raised and the plunger 31 clear of the mold body 30, a measured quantity of material is placed in the body 30. The ram 34 is moved downward, with the plunger 31 suspended from it by bolts 36, and at maximum distance by the action of spring 38. The spring 35 is by design essentially without effort upon the collar 33a, and rod 33 exerts little or no effort upon the diaphragm 32. When the diaphragm 32 encounters the flowable material, it causes this material to flow radially outward and then upward in the annular mold space between the body 30 and the plunger 31: any upwardly yielding of the diaphragm 32 is accompanied and limited by the compression of spring 35 as the rod 33 moves upward. Continued downward movement of the ram is permitted by yielding of the spring 38, accompanied by increase of the sealing pressure at the flange 40: therewith the spring 35 is compressed, and the collar 33a and rod 33 are forced downward, so that the rod deforms the diaphragm 32 and causes further movement of the material, for completing the filling of the mold space which thus is being reduced in volume. This final condition is shown in Fig. 5. The spring 35 can yield, when the reduced mold space is full, to permit completion of the ram stroke. During the subsequent upward return of the ram 34, the springs 35, 38 are unloaded, and the bolts 36 act to raise the plunger 31, and expose the shaped article for removal. It is preferred to have the spring 35 stronger, upon unit movement of the ram, than the spring 38; and stronger than the resilient forces in the diaphragm 32, noting that the diaphragm can be moved to its uppermost relative position by the charge and to its lowermost position by the rod 33.

In Fig. 6, the mold parts 30 and 31 are like those in Fig. 5. In this form, the plunger 31 is directly connected to the ram 34 which latter is formed to provide the piston rod and piston of a fluid pressure cylinder 48. The ram 34 has a transverse slot 41 for receiving a cam 42 mounted on a pivot 43 carried by the ram. The lever extension 44 of the cam 42 can be urged downward and upward as indicated by the double-headed arrow 45. The rod 33 has a collar 33b at its upper end, to be engaged by the cam 42 and forced downward with the downward movement of the lever 44. A coil spring 46 around the rod 33 acts between the collar 33b and an upper surface of the ram 34, to lift the rod 33 when the lever 44 is raised. The general operation is as before: for example, a pill of the material can be placed in the mold body 30, the fluid pressure cylinder 48 is then energized to force the ram 34 downward with its plunger end 31, and pre-shaping occurs as with Fig. 5. When the flange 40 seats and seals, the fluid pressure device maintains pressure thereat. The lever 44 is moved downward, so that the cam 42 forces collar 33b and rod 33 downward, to deform the diaphragm 32 and reduce the volume of the sealed mold. Upon upward movement of lever 44 and reverse energization of the fluid pressure device 48 to lift the ram 34, the plunger 31 is withdrawn, and the pressure upon the diaphragm 32 is relieved.

Figure 7:
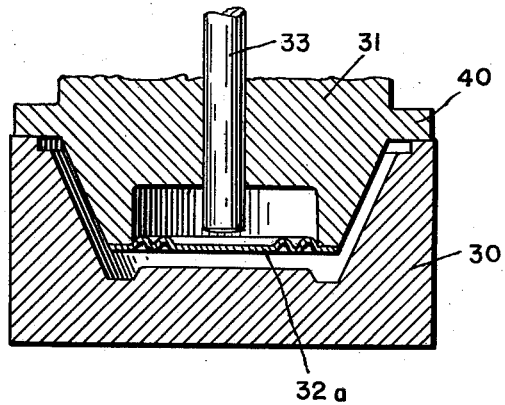
Fig. 7 shows a modified form of flexible wall structure.

The flexible wall portion can be provided in many ways. In the above forms, it is shown as a domed, flattenable disk wherein the materials for the main mold wall portions for the flexible wall portions may be selected so that the main mold structures are stiff and resistant against distortion during molding while the flexible wall portions are capable of distortion or change of position so that the internal volume of the sealed mold space is reduced and thereby complete filling by the measured quantity of material, within the aforesaid tolerance limits, can be effected. The shape of the flexible wall portion can be varied: in Fig. 7, it is shown as a member 32a of generally flat shape so that it may arch in either direction, and as provided with annular corrugations to facilitate its arching. Such a form can be used in any of the apparatus arrangements. When employed with the other parts as shown in Figs. 5 and 6, the diaphragm member 32a can flex upwardly during the pre-shaping, until limited by encountering the end of the rod 33: during the pressing of rod 33 after the mold space has been sealed, the member 32a is returned toward the illustrative flat position, and past such position for example if the measured quantity is near the minimum of tolerance whereby a near-maximum reduction of the volume of the mold space is required.

In Fig. 8, the plunger 31 with its flange 40 is as the above forms; and it is directly connected to the ram 34 which is connected to the piston of a fluid pressure cylinder 48, as in Fig. 6. The female mold body 51 is shown as supported by a spring 20 and guided by the walls 16. A boss 21 of the base plate 17 extends into an aperture at the bottom of the mold body 51. The flexible wall portion is here provided by the diaphragm 52 shown as having a downwardly domed portion and a marginal downwardly turned skirt 53. An annular rib 54 inside the body 51 supports the diaphragm, preferably being secured by brazing or welding to the skirt 53. The parts are shown in Fig. 8 as empty of material, with the body 51, diaphragm 52, and boss 21 in a position occupied while material is being fed thereto: the plunger 31 is shown in a lowered position occupied preliminary to the sealing engagement of flange 40. In this form, the plunger 31 is shaped accurately to the desired internal shape of the article: and the reduction of volume by flattening of the diaphragm effects change in the bottom thickness of the article. The operation is as before: actuation of the fluid pressure device 48 causes the plunger 31 to effect pre-shaping until the flange 40 is seated. The plunger 31 and the mold body 51 then move downward together, with the diaphragm 52 being deformed by the boss 21, until the reducing mold space is filled.

In the further example of apparatus in Fig. 9, the mold body 60 is held stationary and has a lateral passage 62 leading from the mold cavity. The flexible wall portion is provided by a diaphragm 63 secured across the inner end of this passage. The plunger has a shaping portion 31 and a flange 40, the latter sealing against the mold body 60. The plunger has a ram portion 34 illustratively as in Fig. 8. A second ram 64 is connected to move a second plunger 65 which has a flange 66 with apertures for the adjustable bolts 67 which are threaded into the ram 64. A spring 68 acts between the flange 66 and the ram 64. In operation, when the material has been placed in the mold cavity of the body 60, the ram 34 is actuated for the pre-shaping until the flange 40 seals the mold space; and thereafter there is yielding in the ram structure as set out above. The second ram 64 is then actuated so that this plunger 65 acts to distort the diaphragm 63 and thereby reduce the internal volume of the sealed mold space. When the mold is filled the spring 68 yields, to permit the ram 64 to complete a cycle in the illustrated form. The spring 68 is made strong enough to complete the flow of the material to fill the reduced mold space; with the pressure exerted by the ram 34 being sufficient to maintain the sealing at the flange 40 at the maximum effort exerted through the spring 68.

It is obvious that the illustrated forms are not restrictive, and that the invention may be employed in other forms within the scope of the appended claims.

What is claimed is:

1. A molding apparatus comprising a first mold member, a second mold member movable relative to the first mold member and having a portion for closing a mold space between the mold members, first means for moving the second mold member, a slidable plunger guidedly carried by the second mold member for collinear movement relative thereto, a flexible wall portion on said second mold member and located in the path of movement of said plunger, and second means for moving said plunger.

2. A molding apparatus as in claim 1, in which the said second means includes a spring positioned between the said first means and said plunger.

3. A molding apparatus as in claim 1, in which the said second means includes a spring for moving the plunger away from the flexible wall portion, and a cam pivoted on said first means and cooperative with the said plunger for moving it toward the flexible wall portion for distorting the same into the mold space.

4. A molding apparatus comprising a bed structure, a ram movable toward and from the bed structure, a first rigid mold member on the bed structure, a second mold member on the ram and having a rigid portion effective for engaging the first mold member, said mold members being movable relative to one another so that they may be brought into contact for closing a mold space therebetween during the course of movement of the ram, one of said members including a flexible wall portion located to provide a wall of the mold space at a point remote from the point of contact of the mold members, spring means on the ram for holding the second mold member in sealing contact with the first mold member during continued movement of the ram, and a rod carried by and displaceable in said second mold member and actuated upon the said further movement of the ram for distorting the flexible wall portion into the mold space whereby to reduce the volume of the mold space after said mold members have been engaged.

5. A molding apparatus comprising a bed structure, a ram movable toward and from the bed structure, a first rigid mold member on the bed structure, a second mold member on the ram and having a rigid portion effective for engaging the first mold member, said mold members being movable relative to one another so that they may be brought into contact for closing a mold space therebetween during the course of the movement of the ram, said second mold member including a flexible wall portion located to provide a wall of the mold space at a point remote from the point of contact of the mold members, a plunger slidably located within and movable relative to said second mold member, and means effective between the ram and the said plunger for moving the plunger in the direction of the ram movement whereby to distort the flexible wall portion into the wall space whereby to reduce the volume of the mold space after said mold members have been engaged.

6. A molding apparatus as in claim 5, including spring means between said ram and said second mold member effective for permitting further movement of the ram without movement of the second mold member when the volume of the mold space has been filled with the molding material.

7. A molding apparatus as in claim 5, in which a first spring means is provided between the ram and the second mold member effective for permitting further movement of the ram without movement of the second mold member when the volume of the mold space has been filled with the molding material, a second spring means between said ram and said plunger for applying a resilient pressure effect from the ram to said plunger and thence upon the flexible wall portion after the mold members have been closed and during the continued movement of the ram permitted by said first spring means.

8. A molding apparatus comprising a bed structure, a ram movable toward and from the bed structure, a first rigid mold member mounted on the bed structure for movement in the direction of the ram movement, a second mold member on the ram and having a rigid portion effective for engaging the first mold member, said mold members being movable relative to one another so that they may be brought into contact for closing a mold space therebetween during the course of the movement of the ram, said second mold member including a flexible wall portion located to provide a wall of the mold space at a point remote from the point of engagement of the mold members, said apparatus including resilient means for supporting the first mold member from the bed structure prior to contact of said mold members, and means effective during the continued movement of the ram after contact of the mold members for distorting the flexible wall portion into the mold space whereby to reduce the volume of the mold space after said mold members have been engaged.

9. A molding apparatus comprising a movable mold body, a second mold member movable relative to the mold body and having a flange portion for abutting an end surface of the mold body around a mold space in the body for closing the same and effective upon the closing engagement for moving the mold body, said body including a resiliently flexible wall portion, a support for the said wall portion for resisting movement thereof upon movement of the mold body and effective upon such movement for distorting the said wall portion whereby to reduce the volume of said mold space, a ram having a defined stroke of movement, a spring active between the ram and the second mold member for moving the second mold member into the said closing engagement and thereafter moving the second mold member and mold body together, and effective when the mold space is filled to permit the ram to complete its stroke without movement of the second mold member, mold body and wall portion, and spring means effective between said support and said mold body for moving said mold body and flexible wall portion away from the support upon return movement of the ram.

10. A molding apparatus comprising a mold body having an end surface surrounding a mold space, a second mold member movable relative to the mold body and having a peripheral flange portion for engaging said end surface and closing said mold space between the second mold member and mold body, said body including a flexible wall portion for contact with and for shaping a part of the article, a first ram for moving the second mold member, and a second ram including a yielding element for distorting the said wall portion whereby to reduce the volume of said mold space, and place the material being molded under compression in the reduced mold space, said first ram being effective for holding said second mold member portion in sealing position during the distortion of said wall portion.

11. A molding apparatus comprising a hollow mold member having an end surface surrounding a mold space, a second mold member movable relative to the hollow mold member and having a peripheral flange portion for engaging said end surface and closing said mold space between the members, one of said members including a flexible wall portion for contact with and for shaping a part of the article, and means effective for moving the members relative to one another for engaging the same and closing said mold space and thereafter moving the mold members together and distorting the flexible wall portion whereby to reduce the volume of said mold space and place the material being molded under compression in the reduced mold space, said means including a driving part and a driven part, and a resilient yieldable part between said driving and driven parts whereby said driving part can continue movement after the flexible wall has been distorted.

12. A molding apparatus comprising a first mold member, a second mold member movable relative to the first mold member and having a flange portion for abutting against said first mold member and closing a mold space between the mold members, said second mold member including a flexible wall portion sealed thereto and forming a part of the wall of the mold space, and a plunger slidably carried in the second mold member and cooperative with the flexible wall portion for distorting the same whereby to reduce the volume of said mold space.

13. A molding apparatus comprising a bed structure, a ram movable toward and from the bed structure, a first rigid imperforate mold member on the bed structure and having an end surface remote from the bed structure and extending around the mold opening, a second imperforate mold member carried on the ram and having a rigid radially projecting flange portion effective for engaging said end surface of the first mold member, said mold members being movable relative to one another so that the flange portion may be brought into contact with said end surface for closing a mold space between said mold members, one of said members including a resiliently flexible wall portion for contact with and for shaping a part of the article located to provide a wall of the mold space at a point remote from the point of contact of the mold members, and mechanical means effective for engaging and moving and thereby distorting the flexible wall portion into the mold space whereby to reduce the volume of the mold space after said mold members have been engaged and thereby place the material being molded under compression in the reduced mold space.

14. A molding apparatus comprising a bed structure, a ram movable toward and from the bed structure, a first rigid imperforate mold member on the bed structure and having an end surface remote from the bed structure and extending around the mold opening, a second imperforate mold member carried on the ram and having a rigid radially projecting flange portion effective for engaging said end surface of the first mold member, said mold members being movable relative to one another so that the flange portion may be brought into contact with said end surface for closing a mold space between said mold members, one of said members including a flexible wall portion located to provide a wall of the mold space at a point remote from the point of contact of the mold members, guide means for said mold members in which they can move as a unit after they are in contact, and a device fixed to said guide means for distorting the flexible wall portion into the mold space during the movement of said members as a unit whereby to reduce the volume of the mold space after said mold members have been engaged.

15. A molding apparatus as in claim 14, in which the said wall portion is resiliently flexible and rests on said device prior to closure of the mold space.

References Cited in the file of this patent

UNITED STATES PATENTS

| | | |
|---|---|---|
| 1,579,718 | Kuhlke | Apr. 6, 1926 |
| 2,135,825 | Marguerat et al. | Nov. 8, 1938 |
| 2,528,643 | Dubbs | Nov. 7, 1950 |
| 2,570,989 | Seelig | Oct. 9, 1951 |
| 2,582,922 | Crowley | Jan. 15, 1952 |
| 2,658,237 | Cuppett et al. | Nov. 10, 1953 |
| 2,823,422 | Schneider | Feb. 18, 1958 |

FOREIGN PATENTS

| | | |
|---|---|---|
| 1,030,256 | France | Mar. 11, 1953 |